US009400468B2

(12) United States Patent
Wood

(10) Patent No.: US 9,400,468 B2
(45) Date of Patent: Jul. 26, 2016

(54) METHOD AND APPARATUS FOR PREVENTING PREMATURE OR UNNECESSARY REPLACEMENT OF A CONSUMABLE USED IN AN IMAGE PRODUCTION DEVICE

(75) Inventor: James Wood, Ealing (GB)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 13/076,595

(22) Filed: Mar. 31, 2011

(65) Prior Publication Data

US 2012/0250064 A1 Oct. 4, 2012

(51) Int. Cl.

*G06K 15/00* (2006.01)
*G03G 15/00* (2006.01)
*G03G 15/08* (2006.01)

(52) U.S. Cl.

CPC ............ *G03G 15/55* (2013.01); *G03G 15/0863* (2013.01); *G03G 15/502* (2013.01); *G03G 15/5079* (2013.01); *G03G 15/553* (2013.01); *G03G 2215/00109* (2013.01); *G03G 2215/0697* (2013.01)

(58) Field of Classification Search

None

See application file for complete search history.

(56) References Cited

U.S. PATENT DOCUMENTS

| | | | | |
|---|---|---|---|---|
| 7,230,730 | B2 * | 6/2007 | Owen et al. | 358/1.14 |
| 7,526,215 | B2 * | 4/2009 | Moodie et al. | 399/24 |
| 7,649,638 | B2 | 1/2010 | Beard et al. | |
| 7,773,239 | B2 | 8/2010 | Beard et al. | |
| 2004/0223774 | A1 * | 11/2004 | Shimada | 399/27 |
| 2007/0043958 | A1 * | 2/2007 | Sasaki | 713/194 |
| 2011/0267631 | A1 * | 11/2011 | Campbell | G06Q 30/02 358/1.9 |
| 2012/0134686 | A1 * | 5/2012 | Jones et al. | 399/12 |

* cited by examiner

*Primary Examiner* — Marivelisse Santiago Cordero
*Assistant Examiner* — Neil R McLean
(74) *Attorney, Agent, or Firm* — Ronald E. Prass, Jr.; Prass LLP

(57) ABSTRACT

A method and apparatus for preventing premature or unnecessary replacement of a consumable used in an image production device is disclosed. The method may include sensing the removal of the consumable from the image production device, determining if the removed consumable's life span is greater than a predetermined threshold, the predetermined threshold relating to the consumable's expected life span, wherein if it is determined that the removed consumable's life span is not greater than the predetermined threshold, sending a notification to a user at a user interface for the user to enter an identification code, receiving an identification code at the user interface, determining if the correct identification code has been entered, wherein if it is determined that the correct identification code has been entered, permitting operation of the image production device, otherwise, preventing operation of the image production device.

12 Claims, 4 Drawing Sheets

METHOD AND APPARATUS FOR PREVENTING PREMATURE OR UNNECESSARY REPLACEMENT OF A CONSUMABLE USED IN AN IMAGE PRODUCTION DEVICE

BACKGROUND

Disclosed herein is a method for preventing premature or unnecessary replacement of a consumable used in an image production device, as well as corresponding apparatus and computer-readable medium.

Certain functional units in a printing system may be designed to be customer replaceable as they wear out. As such, they remove the need for a service engineer to attend the machine, and maximize the machine up-time for a customer. These consumables are typically posted to customer sites as required and usually this supply may be controlled by the device monitoring the life of the unit; and requesting a re-order as necessary. Analysis of returned consumable units indicate that many of them did not reach the specified end of life (EOL) point and have therefore been swapped out unnecessarily by the customer or service engineer in the (usually mistaken) belief that this action would fix a problem.

It is common for a helpline service to suggest the consumable replacement as it is often seen as a "cure-all" that prevents the need for a service engineer to attend the machine. The result is reduced consumable life and significantly increased costs to service an image production device over the life of such device.

SUMMARY

A method and apparatus for preventing premature or unnecessary replacement of a consumable used in an image production device is disclosed. The method may include sensing the removal of the consumable from the image production device, determining if the removed consumable's life span is greater than a predetermined threshold, the predetermined threshold relating to the consumable's expected life span, wherein if it is determined that the removed consumable's life span is not greater than the predetermined threshold, sending a notification to a user at a user interface for the user to enter an identification code, receiving an identification code at the user interface, determining if the correct identification code has been entered, wherein if it is determined that the correct identification code has been entered, permitting operation of the image production device, otherwise, preventing operation of the image production device.

DETAILED DESCRIPTION

Figure 1:
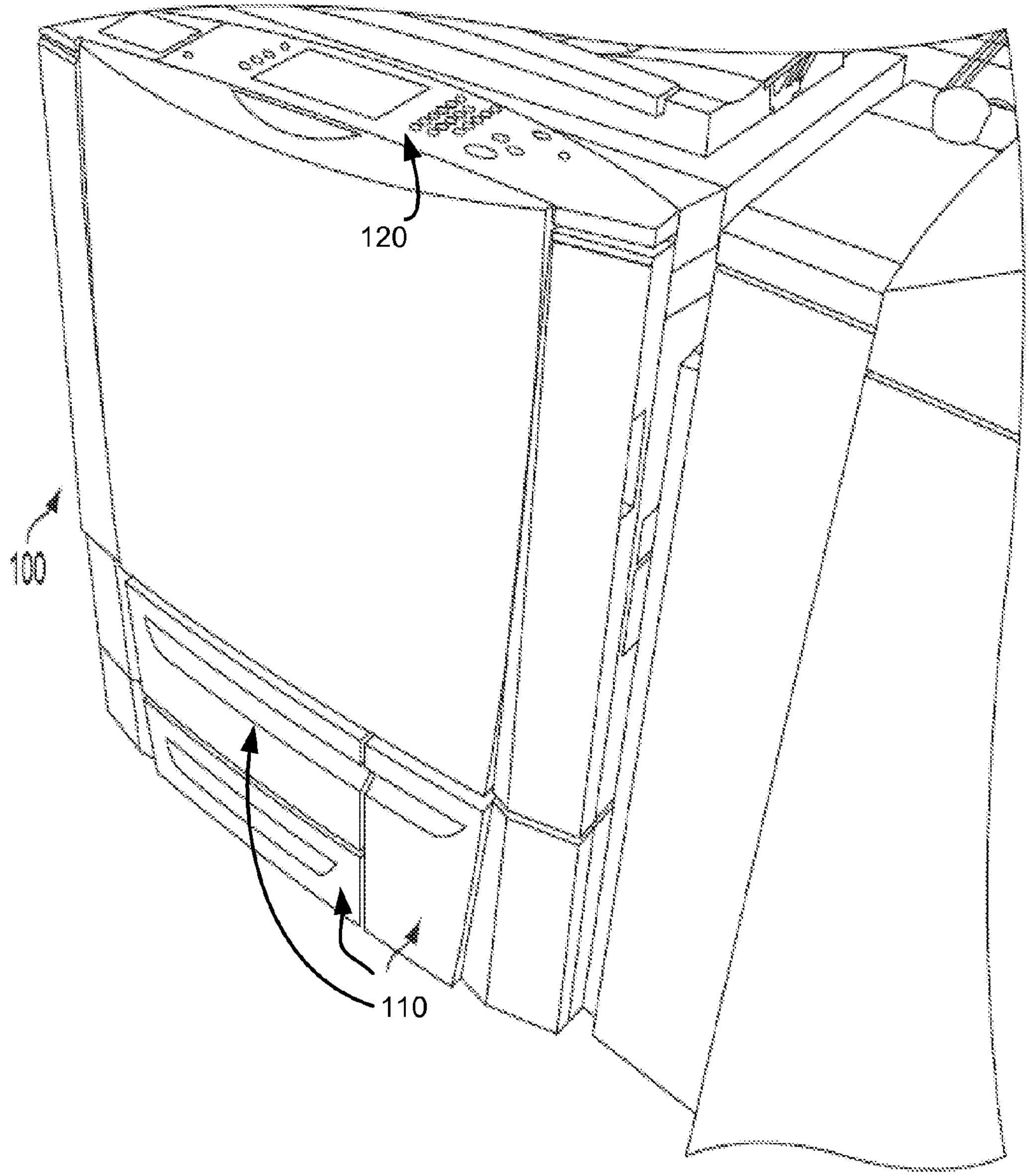
FIG. 1 is an exemplary diagram of an image production device in accordance with one possible embodiment of the disclosure.

Aspects of the embodiments disclosed herein relate to a method for preventing premature or unnecessary replacement of a consumable used in an image production device, as well as corresponding apparatus and computer-readable medium.

The disclosed embodiments may include a method for preventing premature or unnecessary replacement of a consumable used in an image production device. The method may include sensing the removal of the consumable from the image production device, determining if the removed consumable's life span is greater than a predetermined threshold, the predetermined threshold relating to the consumable's expected life span, wherein if it is determined that the removed consumable's life span is not greater than the predetermined threshold, sending a notification to a user at a user interface for the user to enter an identification code, receiving an identification code at the user interface, determining if the correct identification code has been entered, wherein if it is determined that the correct identification code has been entered, permitting operation of the image production device, otherwise, preventing operation of the image production device.

The disclosed embodiments may further include an image production device, that may include a consumable, and a consumable management unit in communication with the consumable that senses the removal of the consumable from the image production device, determines if the removed consumable's life span is greater than a predetermined threshold, the predetermined threshold relating to the consumable's expected life span, wherein if the consumable management unit determines that the removed consumable's life span is not greater than the predetermined threshold, the consumable management unit sends a notification to a user at a user interface for the user to enter an identification code, receives an identification code at the user interface, determines if the correct identification code has been entered, wherein if the consumable management unit determines that the correct identification code has been entered, the consumable management unit permits operation of the image production device, otherwise, the consumable management unit prevents operation of the image production device.

The disclosed embodiments may include a non-transient computer-readable medium storing instructions for preventing premature or unnecessary replacement of a consumable used in an image production device. The instructions may include sensing the removal of the consumable from the image production device, determining if the removed consumable's life span is greater than a predetermined threshold, the predetermined threshold relating to the consumable's expected life span, wherein if it is determined that the removed consumable's life span is not greater than the predetermined threshold, sending a notification to a user at a user interface for the user to enter an identification code, receiving an identification code at the user interface, determining if the correct identification code has been entered, wherein if it is determined that the correct identification code has been entered, permitting operation of the image production device, otherwise, preventing operation of the image production device.

Image production devices, such as, but not included to, multi-function printers (MFPs) and standalone printers may include a number of consumables (or customer replaceable units). If an image production device problem occurs, customers and/or service personnel may replace a consumable before its useful life is complete. Replacing consumables before the specified life time may result in increased costs associated with maintenance of image production devices. The disclosed embodiments may provide a system that may use the consumable identifier and a consumable management unit, along with appropriate techniques which may include end-of-life (EOL) or expected lifespan algorithms which may be implemented by software, to limit replacement of a given consumable. Embodiments herein may check a consumable's life against predefined limits. If the consumable's life span has not been exceeded, a user (e.g., service personnel and/or customers) may be required to contact a designate of the individuals or entity responsible for maintenance of the image product device and obtain an identification code (such as a personal identification number (PIN)) and enter the identification code before enabling the image production device. It is understood that identification code as used herein is intended to mean any information (e.g., series of numbers and/or letters or the like) provided by an authorized designate to verify authorization for operation of the image production device by the customer/operator. The machine may also prompt the customer/operator to put the original consumable back in the machine in the event they can not contact a service center. Advantages may include reduced maintenance cost and increased control by service managers over consumable replacement.

The disclosed embodiments may propose the prevention of unnecessary replacement of consumables by utilizing the existing consumable identifier and the device functionality to recognize the replacement action and lock the usage of the machine unless: the last consumable achieved its specified life; or a service centre provides, following some diagnostic questioning, an "unlock" identification code that will allow the machine to function; or the original consumable is put back in the machine. It is understood that these are just a few of the illustrative criteria for "unlocking" the device and the present embodiments are not limited to these examples. These embodiments would allow there to be zero impact to the cost of the device or consumable.

In the event of a customer complaint call (typically related to print or copy quality issues, perhaps paper jams) to a service centre, the service centre operator may use case-based reasoning (CBR) type tools to hopefully fix the problem remotely. In some cases, the service engineer may call the customer and try to diagnose and fix the issue by direct communication (for example, phone or Internet chat). In both cases, it is common for these people to be incentivized to "avoid the call", so will often prescribe a consumable replacement.

It is also common for customers to do this by themselves (usually the consumable is available on site and does not cost the customer anything if they are on a metered contract) and it is known that some customers replace more than one consumable even though the device only requests the replacement of one even though one has not reached its end-of-life (EOL).

Embodiments herein may be designed to enable more control over this costly event to supervisors or service managers in the supply chain, effectively preventing the replacement unless an identification code is provided to the device. This code may be provided to the customer over the phone for input into the device user interface (UI) or directly to the image production device. The supply chain may decide how/when to provide this code, as they see fit.

The device already recognizes each consumable that has been installed via a consumable management unit that it reads from and to which it writes. Illustrative embodiments of consumable information stored in and obtained from the consumable management unit may include: cycle usage, type, consumable identifier, product compatibility and remaining life information. So the image production device may sense or recognize the replacement of a consumable at any time.

On replacement, if the device recognizes that the removed module was not at EOL, the device may, through the UI, request an identification code to be entered. This identification code, which may or may not be encrypted, may be provided by an authorized designate of an owner or manager of the device via, although not limited to, a call centre. Embodiments may provide that this may occur only after some form of escalation to supervisor/management, following the use of diagnostic questioning. Supplies management may use this feature to ensure that call centre workers and service engineers (or pro-active customers) follow correct procedures and are swapping out consumables for the right reasons.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include one or more media tray doors 110 and a local user interface 120. The one or more media tray doors 110 may provide access to one or more media trays that contain media. The one or more media tray doors 110 may be opened by a user so that media may be checked, replaced, or to investigate a media misfeed or jam, for example.

The user interface 120 may contain one or more display screens (which may be a touchscreen or simply a display), and a number of buttons, knobs, switches, etc. to be used by a user to control image production device 100 operations. The one or more display screen may also display warnings, alerts, instructions, and information to a user. While the user interface 120 may accept user inputs, another source of image data and instructions may include inputs from any number of computers to which the printer is connected via a network.

Figure 2:
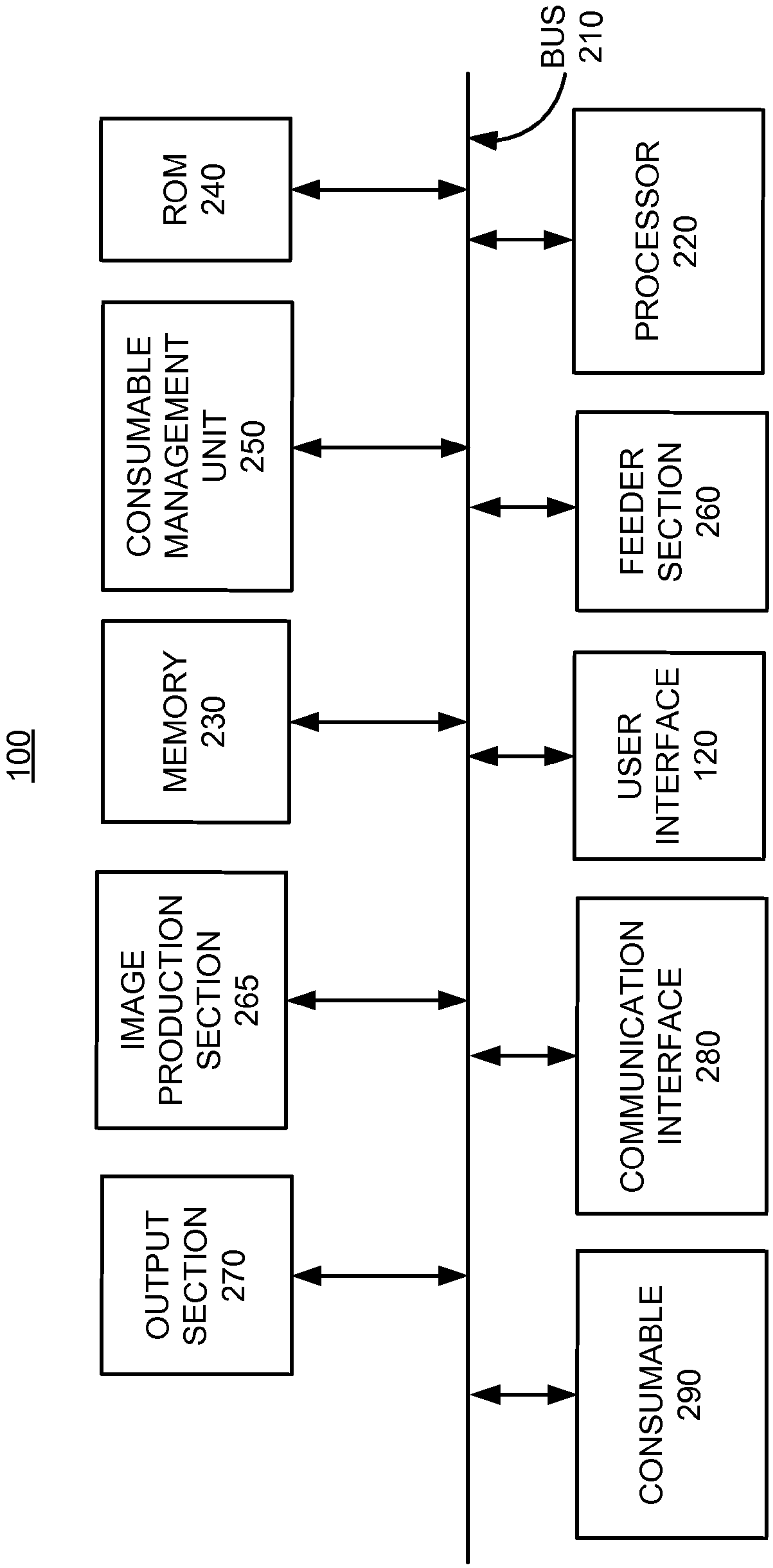
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a consumable management unit 250, a feeder section 260, an output section 270, a user interface 120, a communication interface 280, one or more consumables 290, and an image production section 265. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

The image production section 265 may include hardware to produce image on media and may include an image printing and/or copying section, a scanner, a fuser, etc., for example. The feeder section 260 may be stand-alone or integrated and may store and dispense media sheets on which images are to be printed. The output section 270 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 265.

With reference to feeder section 260, the section may include one or more media trays, each of which stores a media stack or print sheets ("media") of a predetermined type (size, weight, color, coating, transparency, etc.) and may include a feeder to dispense one of the media sheets therein as instructed. The media trays may be accessed by a user by opening the one or more media tray doors 110. The one or more media tray door sensors may sense if one or more media tray door 110 is either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

User interface 120 may include one or more conventional mechanisms that permit a user to input information to and interact with the image production device 100, such as a keyboard, a display, a mouse, a pen, a voice recognition device, touchpad, buttons, etc., for example. Output section 270 may include one or more conventional mechanisms that output image production documents to the user, including output trays, output paths, finishing section, etc., for example.

Figure 4:
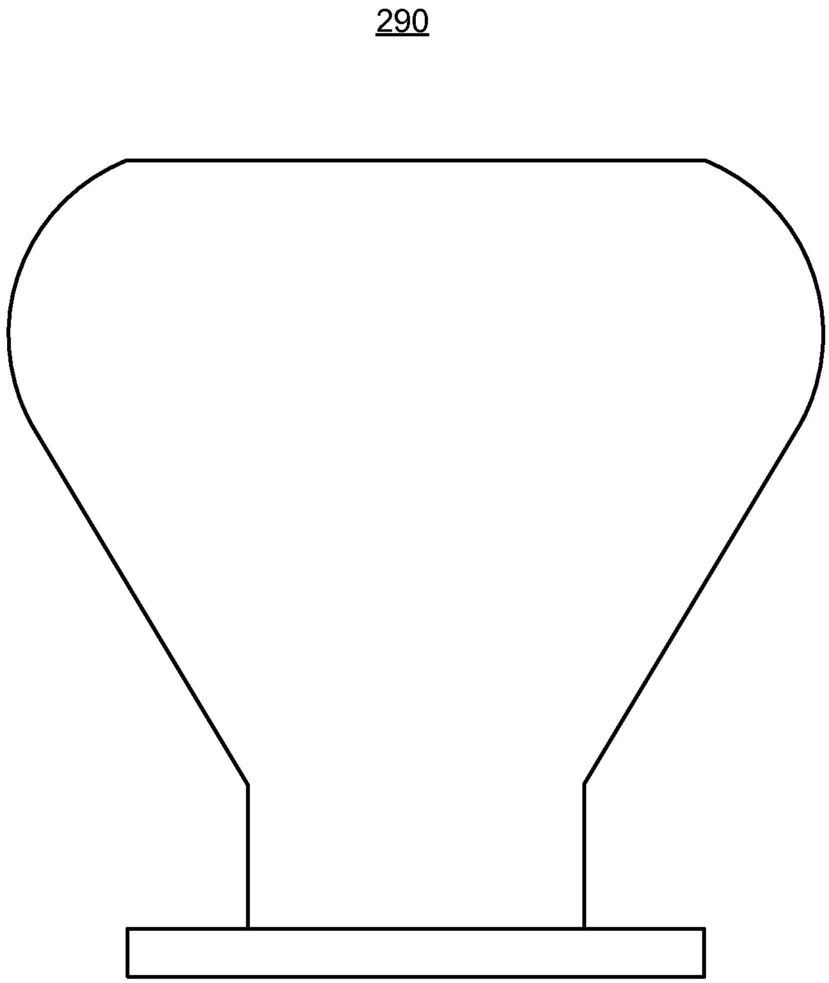
FIG. 4 is an exemplary diagram of a consumable in accordance with one possible embodiment of the disclosure.

Consumables 290 may be any item including cartridges, components, etc. that may be periodically replaced by the user or maintenance personal when required, consumed, or they have reached their end-of-life (EOL). Examples of consumables 290 may be toner cartridges, ink cartridges, imaging drums, dry ink, solid ink, ink sticks (solid ink and ink stick have a unique consumable tagging process and consumable management unit 250 monitoring process known to those of skill in the art), etc. FIG. 4 shows an exemplary diagram of a consumable 290 in the form of a toner bottle in accordance with one possible embodiment of the disclosure.

Consumables 290 are typically posted to customer sites as required, and usually this supply may be controlled by the consumable management unit 250 monitoring the life of the consumable 290 and requesting a re-order as necessary. Consumer management unit 250 technology may define a process by which the state or status of consumables 290 may be monitored to enhance the efficiency or productivity of the image production device 100 on which it is installed. For example, consider the toner cartridge of the image production device 100 where the consumable management unit 250 monitors the amount of toner remaining. The consumable management unit 250 may provide feedback to the image production device 100 as to the number of copies that can be made before a toner cartridge replacement is required. For example, if a user selects a copy quantity in excess of what can be printed, the user can be alerted so that appropriate action may be taken. This technology may be applicable to all image production device 100 subsystems which contain consumables 290, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

The operation of the consumable management unit 250 and an exemplary consumable premature or unnecessary replacement prevention process will be discussed below in relation to the flowchart in FIG. 3.

Figure 3:
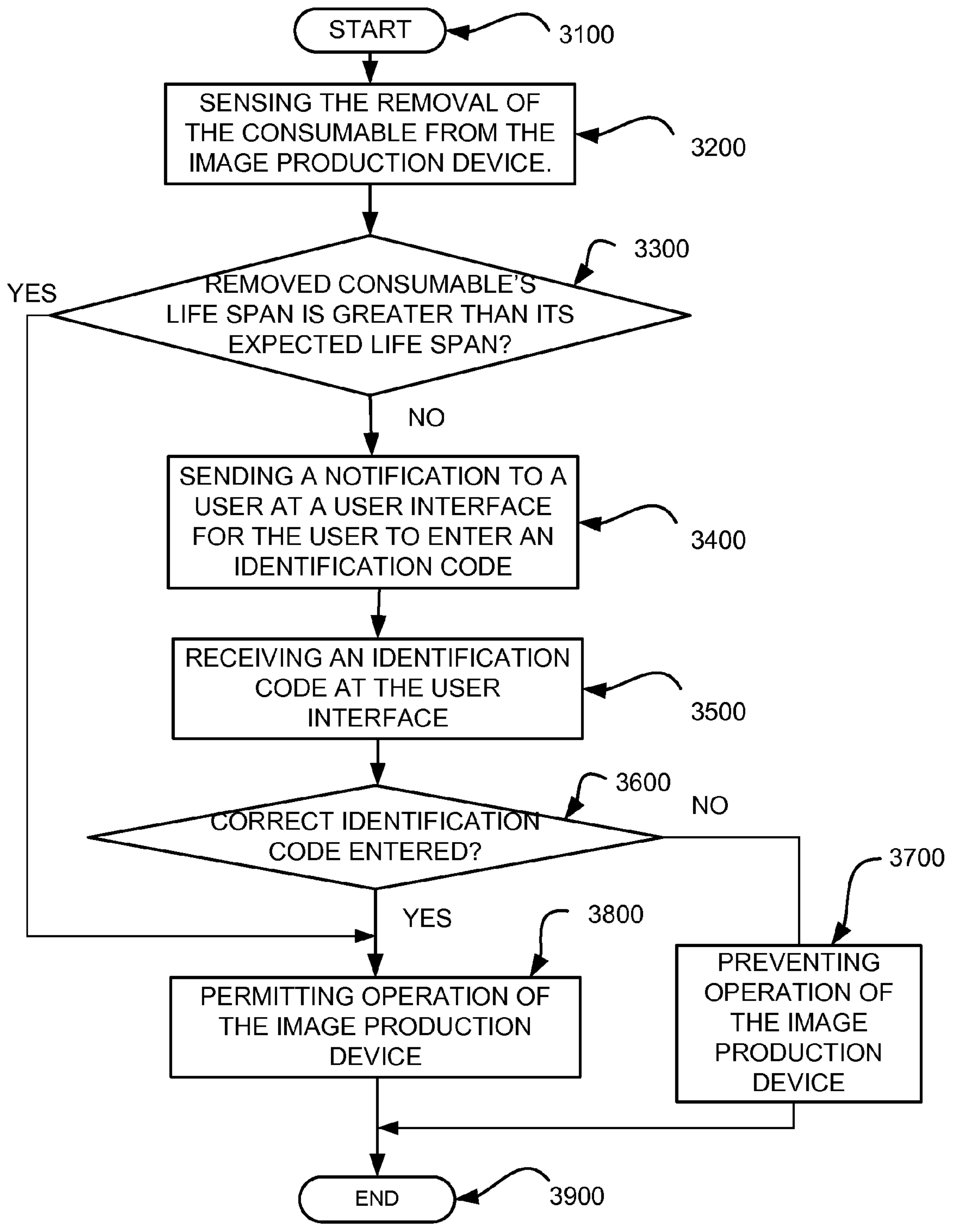
FIG. 3 is a flowchart of an exemplary consumable premature or unnecessary replacement prevention process in accordance with one possible embodiment of the disclosure.

FIG. 3 is a flowchart of an exemplary consumable premature or unnecessary replacement prevention process in accordance with one possible embodiment of the disclosure. The process may begin at step 3100 and may continue to step 3200 where the consumable management unit 250 in communication with the consumable 290 may sense the removal of the consumable 290 from the image production device 100. At step 3300, the consumable management unit 250 may determine if the removed consumable's life span is greater than a predetermined threshold. The predetermined threshold may be related to the consumable's expected life span. Through this process, the consumable management unit 250 may determine information about the consumable 290, wherein the consumable's information may include cycle usage, type, consumable identifier, product compatibility, remaining life, etc., for example, and the predetermined threshold that reflects the consumable's expected life span of the consumable 290 may be determined based on the consumable's information, for example.

If the consumable management unit 250 determines that the removed consumable's life span is greater than the predetermined threshold, the process goes to step 3800 and the consumable management unit 250 may permit operation of the image production device 100. If at step 3300, the consumable management unit 250 determines that the removed consumable's life span is not greater than the predetermined threshold, the process goes to step 3400 and the consumable management unit 250 may send a notification to a user at a user interface 120 for the user to enter an identification code. The identification code may be provided to either the user or the image production device 100 by an authorized designate of a provider of the consumable 290, for example.

At step 3500, the consumable management unit 250 may receive an identification code at the user interface 120. At step 3600, the consumable management unit 250 may determine if the correct identification code has been entered. If the consumable management unit 250 determines that the correct identification code has not been entered, at step 3700, the consumable management unit 250 may prevent operation of the image production device 100.

If at step 3600, the consumable management unit 250 determines that the correct identification code has been entered, the process may proceed to step 3800, where the consumable management unit 250 may permit operation of the image production device 100. The consumable management unit 250 may also notify the user via the user interface 120 of an option to reinstall the removed consumable 290 back into the image production device 100 to resume operation and may allow the image production device 100 to resume operation once the removed consumable 290 is replaced back into the image production device 100. In this manner, the consumer management unit 250 may determine the consumable 290 to be an existing consumable or a replacement consumable using a consumable identifier associated with each consumable 290. The process may then go to step 3900, and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image production device, comprising:

a consumable; and a consumable management unit in communication with the consumable that senses the removal of the consumable from the image production device to prevent premature or unnecessary replacement of a consumable by:

determining information about the consumable, wherein the consumable's determined information includes cycle usage, type, consumable identifier, product compatibility, remaining life, and a predetermined threshold relating to the consumable's expected life span based on the consumable's determined information;

determining if the removed consumable's life span is greater than the predetermined threshold, the predetermined threshold relating to the consumable's expected life span;

in response to the removed consumable's life span being greater than the predetermined threshold, then permitting operation of the image production device despite premature or unnecessary replacement of the consumable;

in response to the removed consumable's life span not being greater than the predetermined threshold, then sending a notification to a user at a user interface to enter an unlock identification code, and then determining if the unlock identification code has been entered by the user to permit operation of the image production device or to prevent operation of the image reproduction device until receiving the unlock identification code;

wherein the notification comprises an option to reinstall the removed consumable back into the image production device to resume operation and allowing the image production device to resume operation once the removed consumable is replaced back into the image production device.

2. The image production device of claim 1, wherein the unlock identification code is provided to one of the user and the image production device by an authorized designate of a provider of the consumable.

3. The image production device of claim 1, wherein the consumable is determined to be an existing consumable or a replacement consumable using a consumable identifier associated with each consumable.

4. The image production device of claim 1, wherein the image production device is one of a copier, a printer, a facsimile device, and a multi-function device.

5. A non-transitory computer-readable medium storing instructions for controlling a computing device for preventing premature or unnecessary replacement of a consumable used in an image production device, the instructions comprising:

determining information about the consumable, wherein the consumable's determined information includes cycle usage, type, consumable identifier, product compatibility, remaining life, and a predetermined threshold relating to the consumable's expected life span based on the consumable's determined information;

sensing the removal of the consumable from the image production device;

determining if the removed consumable's life span is greater than the predetermined threshold, the predetermined threshold relating to the consumable's expected life span;

in response to the removed consumable's life span being greater than the predetermined threshold then permitting operation of the image production device despite premature or unnecessary replacement of the consumable;

in response to the removed consumable's life span not being greater than the predetermined threshold, then preventing operation of the image reproduction device until receiving an unlock identification code, sending a notification to a user at a user interface to enter the unlock identification code, and determining if a correct unlock identification code has been entered to permit operation of the image production device;

wherein the notification comprises an option to reinstall the removed consumable back into the image production device to resume operation and allowing the image production device to resume operation once the removed consumable is replaced back into the image production device.

6. The non-transitory computer-readable medium of claim 5, wherein the unlock identification code is provided to one of the user and the image production device by an authorized designate of a provider of the consumable.

7. The non-transitory computer-readable medium of claim 5, wherein the consumable is determined to be an existing consumable or a replacement consumable using a consumable identifier associated with each consumable.

8. The non-transitory computer-readable medium of claim 5, wherein the image production device is one of a copier, a printer, a facsimile device, and a multi-function device.

9. A method for preventing premature or unnecessary replacement of a consumable used in an image production device, comprising:

determining information about the consumable, wherein the consumable's determined information includes cycle usage, type, consumable identifier, product compatibility, remaining life, and a predetermined threshold relating to the consumable's expected life span based on the consumable's determined information;

sensing the removal of the consumable from the image production device;

determining if the removed consumable's life span is greater than the predetermined threshold, the predetermined threshold relating to the consumable's expected life span;

in response to the removed consumable's life span being greater than the predetermined threshold, then permitting operation of the image production device despite premature or unnecessary replacement of the consumable;

in response to the removed consumable's life span not being greater than the predetermined threshold, then preventing operation of the image reproduction device until receiving an unlock identification code, sending a notification to a user at a user interface to enter the unlock identification code, and determining if a correct unlock identification code has been entered to permit operation of the image production device;

wherein the notification comprises a message with an option to reinstall the removed consumable back into the image production device to resume operation and allowing the image production device to resume operation once the removed consumable is replaced back into the image production device.

10. The method of claim 9, wherein the unlock identification code is provided to one of the user and the image production device by an authorized designate of a provider of the consumable.

11. The method of claim 9, wherein the consumable is determined to be an existing consumable or a replacement consumable using a consumable identifier associated with each consumable.

12. The method of claim 9, wherein the image production device is one of a copier, a printer, a facsimile device, and a multi-function device.

* * * * *